May 22, 1945. L. S. GREENLAND 2,376,690
THROTTLE CONTROL DEVICE FOR AIRCRAFT ENGINES
Filed April 10, 1944 4 Sheets-Sheet 1
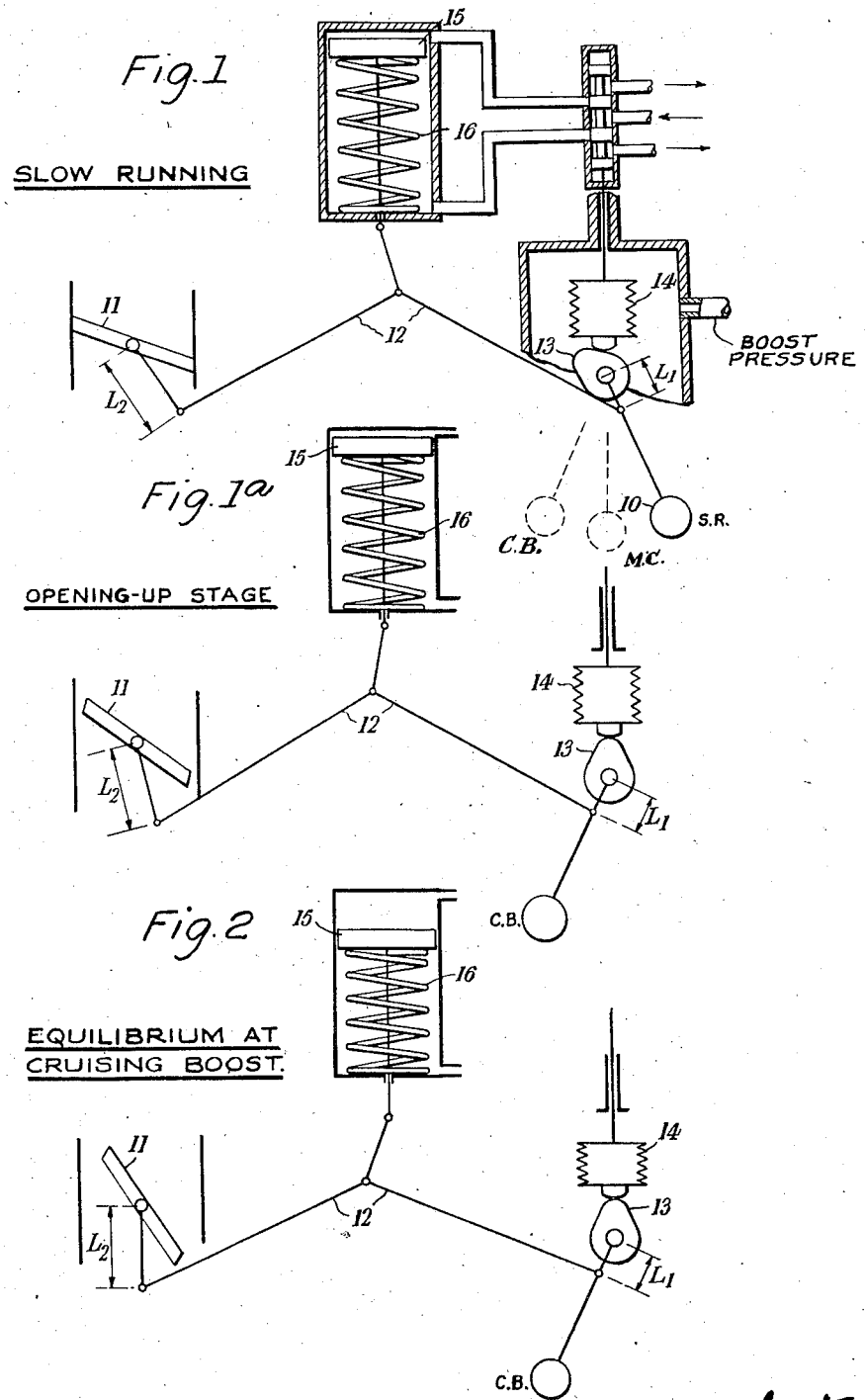

May 22, 1945.    L. S. GREENLAND    2,376,690
THROTTLE CONTROL DEVICE FOR AIRCRAFT ENGINES
Filed April 10, 1944    4 Sheets-Sheet 2

OLD TYPE LINKAGE.

NEW TYPE LINKAGE

May 22, 1945. L. S. GREENLAND 2,376,690
THROTTLE CONTROL DEVICE FOR AIRCRAFT ENGINES
Filed April 10, 1944 4 Sheets-Sheet 3

May 22, 1945.  L. S. GREENLAND  2,376,690
THROTTLE CONTROL DEVICE FOR AIRCRAFT ENGINES
Filed April 10, 1944  4 Sheets-Sheet 4
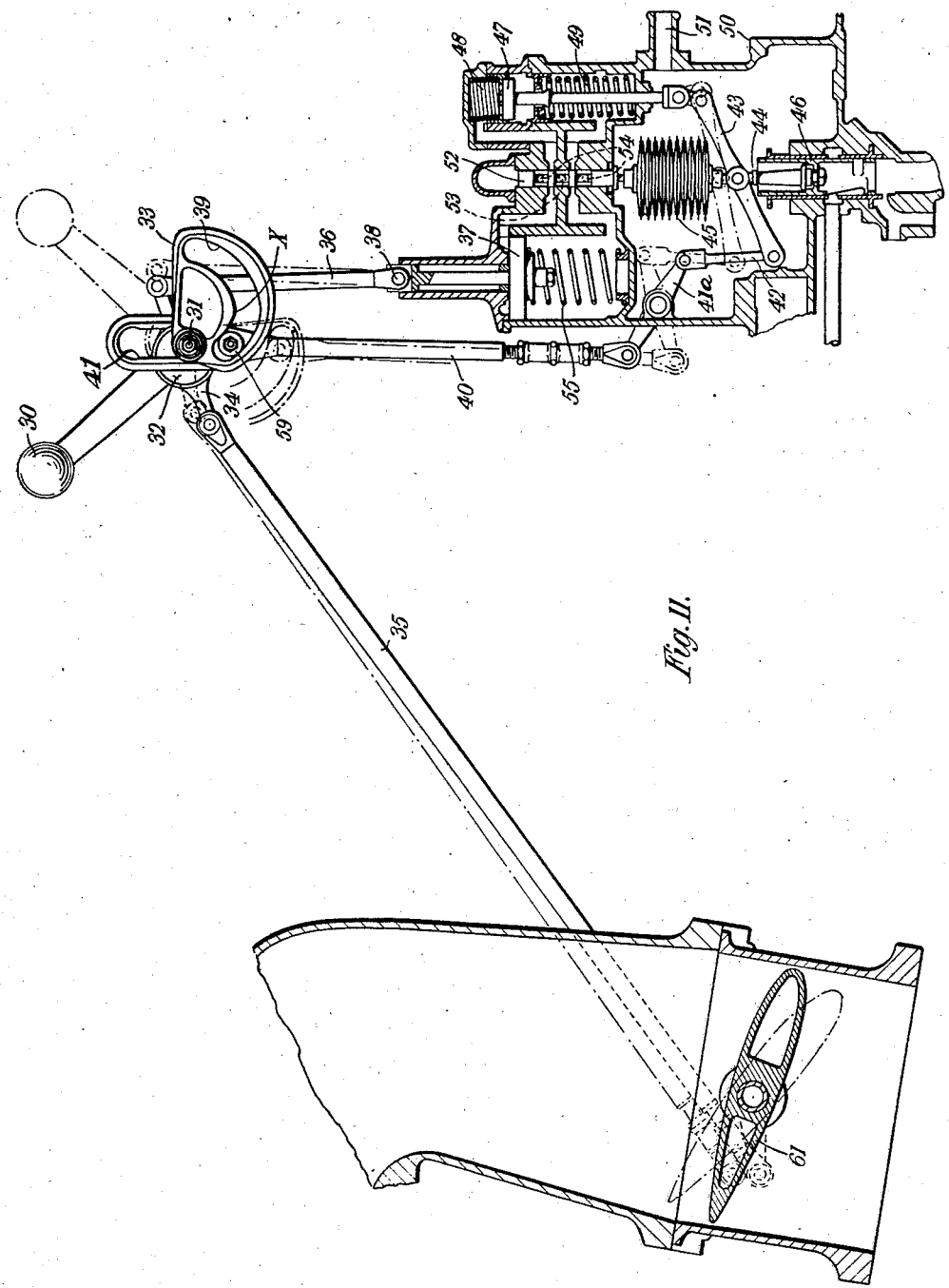
Fig. II.

Patented May 22, 1945

2,376,690

UNITED STATES PATENT OFFICE 2,376,690

THROTTLE CONTROL DEVICE FOR AIRCRAFT ENGINES

Leonard Sidney Greenland, Coventry, England, assignor to H. M. Hobson (Aircraft & Motor) Components Limited, London, England Application April 10, 1944, Serial No. 530,428
In Great Britain April 8, 1943

3 Claims. (Cl. 123—119)

This invention relates to throttle controls for aircraft engines of the kind, described for example in U. S. Patent No. 1,995,800, in which the servo piston of a variable datum boost control device varies the setting of a mechanical linkage interposed between the pilot's throttle lever and the throttle valve in such a way as to prevent excessive opening of the throttle valve.

Such apparatus has hitherto been used on engines fitted with a float type carburetter and it has been the invariable practice to construct the linkage in such a way that movement of the pilot's lever from slow running to cruising boost produces a large opening of the throttle valve, e. g. 60° or more, the boost control device acting below the full throttle height, i. e. the altitude at which cruising boost (C. B.) can be sustained only with full throttle, to reduce the throttle movement produced manually by the action of the pilot's lever. Due to its construction, this arrangement has the disadvantage that, as explained below, at certain positions of the pilot's lever for altitudes greater than the full throttle height, the throttle valve is restrained short of its full opening although the boost pressure in the induction manifold may be less than the value selected by the position of the pilot's lever. Under these conditions, the maximum height to which a selected boost pressure can be maintained is less than that obtainable when the throttle valve is permitted to reach its full open position.

According to the invention the linkage between the pilot's lever and the throttle valve is so arranged that movement of the pilot's lever from slow running to cruising boost is only effective to move the throttle valve through a relatively small angle, e. g. about 10°. The major portion of the required movement of the throttle valve is communicated by the servo piston of the boost control device, said piston being under the influence of a servo valve which is controlled from the pilot's throttle lever through a barometric element exposed to boost pressure.

Figure 3:
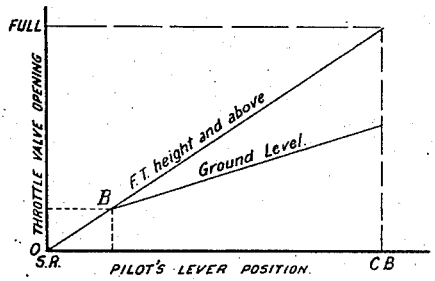
Figure 4:
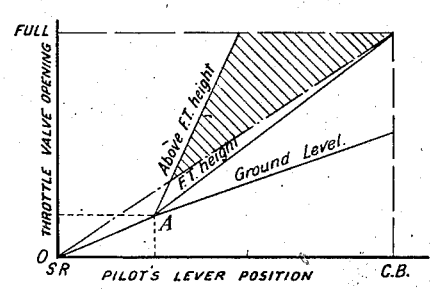
Figure 5:
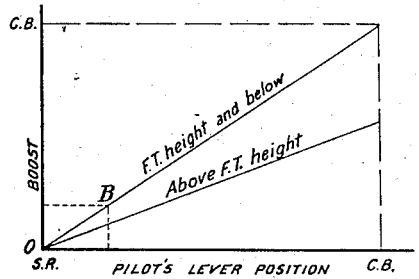
Figure 6:
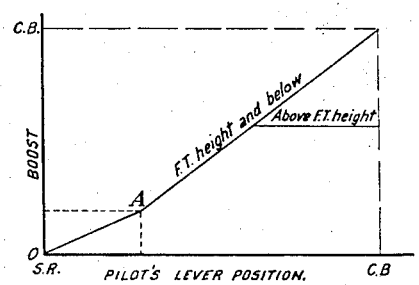
Figure 7:
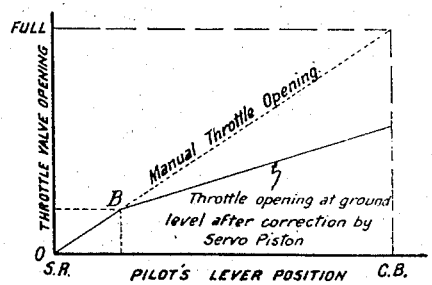
Figure 8:
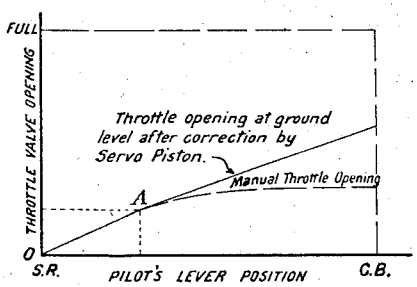

In the accompanying drawings,

Figs. 1, 1a and 2 are respectively diagrammatic showings of the layout of a linkage according to the invention, showing successive stages in the operation of the parts as the pilot's lever is moved to open the throttle, Figs. 3–8 are graphs affording a comparison between the old linkage (Figs. 3, 5 and 7) and the new linkage (Figs. 4, 6 and 8).

Figures 9, 10:
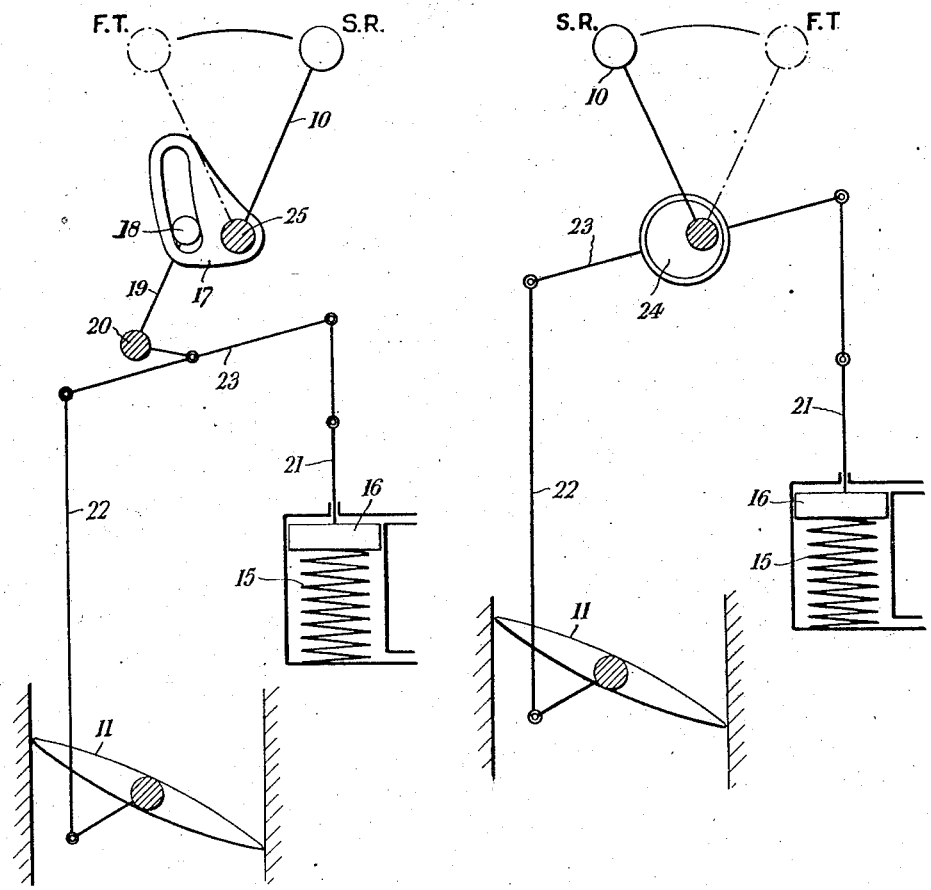

Figs. 9 and 10 are diagrammatic showings of two alternative forms of throttle linkage according to the invention, and Fig. 11 is a detailed drawing of a preferred linkage according to the invention.

It will be understood that Figs. 1, 1a and 2 are diagrams only, the servomotor not being shown in detail in these figures. In each case, however, the servomotor is of the construction shown in Fig. 11 and is operated in similar fashion by the capsule responsive to boost pressure.

Figure 1 represents the conditions at slow running, Fig. 1a those prevailing immediately after the pilot's lever has been moved to the cruising boost position and Fig. 2 those prevailing after the servo motor has come into operation. In each figure, 10 represents the pilot's lever, 11 the throttle valve, 12 a toggle linkage connecting them, 13 the variable datum cam, 14 the capsule of the boost control device, 15 the servo piston of the latter and 16 a spring associated with the servo piston. In the case of the new linkage, a toggle is not ordinarily employed, but a toggle which is the equivalent of the actual linkage is shown in Figs. 1, 1a and 2. In each of these figures, the servo cylinder is shown disposed vertically, and reference is hereinafter made to the top and bottom ends of the cylinder. It will be understood, however, that the servo cylinder may be disposed horizontally or in any other convenient position.

In the case of the known linkage, the servo piston is caused to move to the bottom end of its cylinder at slow running, and the throttle valve is closed under these conditions, the linkage connecting the pilot's throttle lever and the throttle valve being straight.

On moving the pilot's lever to the cruising boost position, the first action is for the linkage to open the throttle valve 11 mechanically to a wide angle, the piston remaining at the bottom of its cylinder. Then, when the relay mechanism has had time to operate, pressure oil is admitted to the underside of the piston, so causing the latter to rise towards the top end of the cylinder, break the linkage and close the throttle valve 11 to obtain the desired boost.

As altitude increases, with the pilot's lever remaining in the same position, the boost control will operate to force the piston progressively down to the bottom position. At the full throttle height the piston will reach the limit of its travel and the throttle will be fully open. Above this height a lower boost than cruising boost will be obtained with the pilot's lever at the cruising boost position and the throttle fully open, and when the pilot's lever is moved towards the closed position at such a height the boost will progressively reduce (as later explained with reference to Fig. 5) by virtue of the straight linkage.

In the case of the linkage according to the invention, the leverage $$\frac{L_1}{L_2}$$

is considerably reduced as compared with that in the case of the old linkage, the spring 16 is on the other side of the servomotor piston 15 and the latter is at the top of its cylinder at slow running, thus breaking the linkage 12 (see Fig. 1). This is because the cam 13 is shaped to direct high pressure oil to the underside of the piston at low throttle openings and thus ensure that the piston is inoperative.

On movement of the pilot's lever to the cruising boost position, Fig. 1a, the linkage 12 remains toggled and due to the decreased leverage $$\frac{L_1}{L_2}$$

the manual movement so imparted to the throttle valve can only open it by a small amount, say 10°.

Immediately afterwards the relay mechanism comes into action, the piston 15 descending in its cylinder, thereby straightening the linkage and opening the throttle until the required boost is obtained, Fig. 2.

As height is increased with the pilot's lever in this position, the servo piston will continue to descend and straighten the linkage until, at full throttle height, the throttle becomes fully open.

If at any height near the full throttle height, the pilot moves his throttle lever towards the slow running position, he will only close it manually by a few degrees, which will have no appreciable effect on boost pressure, and the remaining closing of the throttle will be obtained by toggling of the linkage via the servo piston.

At the time that the variable datum boost control described in U. S. Patent No. 1,995,800 was developed, the boost pressure in all aircraft engines then known increased progressively with the throttle opening as the throttle valve was opened from the slow running position. In the case, however, of more recent types of aircraft engine, which have a considerable degree of valve overlap, the phenomenon of boost reversal occurs at low throttle opeings. With such engines the boost pressure is higher when the pilot's lever is at slow running than when it has been moved slightly away from this position in the direction to open the throttle. If, therefore, a variable datum cam, designed to give a progressive diminution of boost as the throttle closes, is used and so coupled to the throttle that the servo mechanism is in operation throughout the range of movement of the pilot's lever, the result would be that at slow running the engine would, due to the valve overlap, be receiving an actual boost pressure in excess of that called for by the cam. When the pilot's lever is moved from the slow running position, the actual boost will fall, and the servomotor will not be effective to open the throttle until the boost has risen again, due to continued mechanical opening by the pilot's lever, to a value just in excess of that prevailing at slow running. There will then be a sudden surge of power due to the sudden opening of the throttle, which renders fine control of the engine at low powers impossible. The invention accordingly provides for the boost control servomotor being put out of action when the pilot's lever in moving to close the throttle has reached a position hereinafter referred to as the point of manual control, somewhat more open than the slow running position. This is achieved by so designing the cam 13 that the servo piston 15 is brought to the top of its cylinder at the point of manual control, and remains there as the pilot's lever is moved on into the slow running position, so that the throttle is operated by the mechanical linkage only between slow running and the point of manual control.

In the case of an engine subject to boost reversal, the point of manual control must, in order or avoid the above-indicated disadvantage, be located outside the range of boost reversal, i. e. it must represent a position of the pilot's lever coinciding with or somewhat more open than the upper limit of the range of boost reversal.

The advantages gained with the new linkage will be appreciated by reference to Figs. 3–8 of the drawings. Figs. 3 and 4 are graphs showing the relationship between throttle valve opening and pilot's lever position for the old and new linkages respectively, and Figs. 5–8 are similar graphs showing the relationship between boost pressure, throttle angle and pilot's lever position, Figs. 5 and 7 relating to the old linkage and Figs. 6 and 8 to the new linkage.

For purposes of comparison with the new linkage, it is assumed in Figs. 3, 5 and 7 that, in the case of the old linkage, the servo mechanism is likewise placed out of action when the pilot's lever, on moving to close the throttle, reaches the point of manual control.

These advantages can be explained as follows:

1. *Increased power at height*

By comparison of the curves in Figs. 3 and 4, it is revealed that for pilot's lever positions between the point of manual control (i. e. the position of the pilot's lever at which, as the lever is moved to close the throttle, the servo piston of the boost control device is brought to a stop at the end of its cylinder, this point being indicated at B in Fig. 3 and at A in Fig. 4) and that of C. B., a larger throttle valve opening is available above the full throttle height with the new linkage, as indicated by the shaded zone in Fig. 4. This means that selected boosts within the cruising range can be sustained to greater heights, the limit being reached only when the throttle has attained the full open position. For installations where engine R. P. M. and boost pressures are mechanically interconnected, this represents an economy, it being understood that the best economy for a given power is obtained when the R. P. M. are lowest. Figs. 5 and 6 show the boost pressures relating to the conditions shown in Figs. 3 and 4.

2. *Improved control at low powers*

With high powered aero-engines in use at the present time, small movements of the throttle valve produce relatively large changes in engine power which can present difficulties during taxiing. By virtue of the reduced lever ratio shown in Figs. 1, 1a and 2, it will be appreciated that a very slow opening of the throttle valve over the manual range is obtained for a relatively large movement of the pilot's lever, thus giving the pilot improved control for taxiing the aircraft.

This effect is illustrated in Fig. 8 by the slope of the line OA which indicates that for a given movement of the pilot's lever, the change of throttle opening with the new linkage is less than that with the old type which is represented by line OB in Fig. 7.

In practice, the means for controlling the throttles can best be obtained by linkage arrangements other than that shown in Figs. 1, 1a and 2. Two such arrangements are shown diagrammatically in Figs. 9 and 10 of the drawings.

In the arrangement shown in Fig. 9, the pilot's lever 10 carries a cam 17 cooperating with a roller 18 carried by a bell crank 19 pivoting on a fixed fulcrum 20. The other arm of the bell crank is pivoted to a rocking lever 23 connected at one end to the piston rod 21 of the servo piston 16 and at the other by a link 22 to the throttle valve 11. The servo piston, as in the case of Figs. 1, 1a and 2, is associated with a spring 15 operating to urge it towards the slow running position.

In the scheme shown in Fig. 10, the servo piston 16 operates the throttle valve 11 via a linkage incorporating a rocking lever 23 pivoted on an eccentric shoulder 24 carried on the layshaft 25 fixed to the pilot's lever 10. Thus, with the servo piston 16 stationary, the action of the eccentric shoulder 24 within the rocking lever 23 is to produce a small opening of the throttle valve 11 for a large movement of the pilot's lever 10.

With both these arrangements, the servo piston 15 is free to override the pilot's lever 10 and adjust the throttle opening to obtain the boost selected.

The major part of the available manual opening is communicated to the throttle valve during the range of boost reversal, where of course, the servo mechanism is inoperative. It is preferred, however, to arrange that a small amount of manual opening is extended over the remaining movement of the pilot's lever in order to avoid a sudden discontinuity as between manual and servo operation when the servo mechanism comes into action as the lever moves out of the slow running range, see Figs. 7 and 8.

When desirable, the throttle opening over the latter portion of the lever movement can be such as to provide a reasonable degree of power in the event of servo failure through lack of fluid pressure.

3. Reduced operating loads

The passage of air past the throttle valve creates a closing torque on the throttle spindle which is transmitted back through the operating linkage in the nature of a direct load on the pilot's lever. With high powered engines employing large multiple throttles, this loading can become a serious problem.

With the old type of linkage which had manual over-opening and servo closing, the effort needed at the pilot's lever in order to open the throttles, was considerable.

The improved leverage of the new linkage decreases the effort needed at the pilot's lever over the manual range, i. e. up to position A in Fig. 8, and from this point onwards, the greater portion of the throttle movement is accounted for by the servo piston and consequently, the load on the pilot's lever is quite small.

4. Improved acceleration

One of the chief causes of poor acceleration in a suction carburetter fitted with the old type linkage is the fact that with rapid movement of the pilot's lever towards full power, the throttle is initially over-opened to a large angle, which largely destroys the suction on the slow running fuel system. Thus there is a deficiency in the amount of fuel entering the engine until it has speeded up sufficiently to induce flow from the main fuel system. With the new linkage this condition cannot occur due to the limit imposed on the extent of manual throttle opening. The defect can be remedied by using a large accelerator pump, but of course, the type of linkage giving the required engine acceleration with only small assistance from the accelerator pump is to be preferred.

When an injector of the type described in copending application Serial No. 494,514 is fitted with a boost control linkage according to the invention as shown in and hereinafter described with reference to Fig. 11, the movement of the pilot's lever during acceleration simultaneously increases the area of the fuel metering port. This gives a lead to the fuel because of the slight lag in the operation of the servo mechanism and results in a rich mixture during acceleration which is desirable.

It will be understood that a remote acting fluid pressure system may be used for transmitting the movement of the pilot's lever to the throttle valve, e. g. a system of the type described in British Patent No. 483,049. The linkage according to the present invention will then be incorporated between the servo piston of the receiver unit of said fluid pressure system and the throttle valve.

In Fig. 11 is shown in greater detail, by way of example, one specific embodiment of throttle control according to the invention.

In this figure, the parts are shown in full lines in the positions they occupy with the pilot's lever 30 in the slow running position. The chain-dotted lines show the effect of manual opening of the throttle valve 61 by movement of the pilot's lever into the cruising boost position, the parts being shown in the positions they occupy before the boost control has had time to operate.

The pilot's lever 30 has fixed to it a shaft 31 mounted to turn in bearings (not shown). On the shaft 31 are fixed an eccentric 32 and a cam 33. Surrounding the eccentric 32 is a yoke 34, pivoted at one end to a link 35 connected to the throttle valve 61 and at the other end to a link 36, pivoted at its lower end 38 to the piston rod of the servo piston 37 of the boost control device.

As will be seen, manual opening of the throttle, on movement of the pilot's lever from the slow running to the cruising boost position is effected by bodily movement of the eccentric 32, the link 36 rocking about its lower pivot 38. This manual opening by the mechanical linkage between the pilot's lever and the throttle valve is small, as shown, being only about 10°.

The cam 33, which is the variable datum cam, has a cam slot 39 engaged by a roller 59 mounted on a link 40. A slot 41 at the upper end of the link 40 engages a circular boss (not shown) on the shaft 31 and guides the link in the up and down movements communicated to it by the cam.

The lower end of the link 40 is connected by intermediate links 41a, 42 to the left hand end of a cross link 43. This cross link is pivoted centrally to a rod 44 connected at its upper end to the capsule 45 of the boost control device and at its lower end to a sleeve 46 forming part of a variable-area fuel metering orifice through which fuel is pumped to the engine as described and claimed in co-pending application Serial No. 494,514. The right hand end of the cross link 43 is pivoted to the piston rod of a normally inoperative resetting piston 47 which however, operating against its upper spring 48 provides a correction in the fuel flow in the range of boost reversal and, operating against its lower spring 49 corrects the fuel flow above full throttle height.

The capsule 45 is mounted in an enclosure 50 exposed to boost pressure through a conduit 51, and is attached at its upper end to a control valve 52. This controls in known manner the connections between a pressure inlet 53, exhaust outlets 54 and the cylinders of the two servo pistons 37, 47.

It is clear that movement of the pilot's lever from slow running to cruising boost will raise the left hand end of the cross link 43, so lifting the capsule 45 and control valve 52 and directing pressure oil to the upper side of the servo piston 37. This will therefore move down, rocking the yoke 34 clockwise about the eccentric 32 and opening the throttle valve to a position such that cruising boost is obtained, the resulting contraction of the capsule 45 returning the control valve 52 to its neutral position, and causing the downward movement of the servo piston 37 to cease.

Under normal conditions, i. e. below full throttle height, the resetting piston 47 is inoperative, being maintained in the position illustrated by its spring 49. This spring is stronger than the spring associated with the main servo piston 37 so that when pressure oil is admitted to the upper ends of the two cylinders—which occurs when there is a fall in boost—the main servo piston 37 only will be depressed. Depression of this piston results in opening movement of the throttle. When, however, full throttle height is reached the piston 37 reaches the bottom of its cylinder, and above this height the engine is unable to maintain the selected boost when the pilot's lever is in the full throttle position. The resultant expansion of the capsule, however, results in admission of pressure oil to the upper end of the cylinder housing the resetting piston. This then moves down against its spring 49 to reduce the area of the fuel metering orifice and so adjust the fuel flow to conform with the reduced boost.

Under normal conditions due to the fact that the spring 49 is stronger than the spring 55, the resetting piston 47 has no influence on the capsule, the link 43 pivoting about its right-hand end which remains stationary. When the resetting piston moves down above full throttle height the link 43 pivots about its left-hand end.

When the pilot's lever is at or near slow running and the servo piston 37 is held inoperative in its upper limiting position, an increase in boost due to boost reversal causes admission of pressure fluid to the under surface of piston 47, which then rises against its spring 48 to open the metering orifice somewhat and adjust the fuel flow to suit this increase in boost. Under ordinary conditions in which piston 37 is free to rise, the spring 48 will prevent the resetting piston 47 from moving.

The resetting piston forms no part of the present invention and is only illustrated to complete the showing of the whole installation. It comes into operation only under the two specific abnormal conditions referred to, i. e. above full throttle height when it reduces the fuel flow to compensate for the fact that selected boost cannot be maintained, and below the point of manual control when it increases the fuel flow if the boost rises due to boost reversal.

The cam slot 39 is so shaped that, when the roller 59 reaches the point marked X on movement of the pilot's lever towards the slow running position, the servo piston 37 reaches the top or slow running end of its cylinder, while on continued movement of the pilot's lever towards the slow running position, the servo piston 37 remains at the top of its cylinder and the servo motor is therefore inoperative. The position of the pilot's lever at which the roller 59 is at the point X of the cam slot 39 is the position hereinbefore referred to as the point of manual control and corresponds to the upper limit of the range of boost reversal.

Almost the whole of the manual movement communicated to the throttle valve by the mechanical linkage from the pilot's lever takes place during movement of the pilot's lever over the range from the slow running position to the point of manual control. A small residual manual movement is however imparted to the throttle valve by movement of the pilot's lever over the range from the point of manual control to the cruising boost position, as indicated in Fig. 8.

It will be understood that the terms "piston" and "cylinder" as used herein are intended to comprehend the functionally equivalent elements of a vane type motor, as disclosed for example in Serial No. 551,703 of Stanley V. Maddox for Servomotors.

I have described what I believe to be the best embodiment of my invention. I do not wish, however, to be confined to the embodiment shown, but what I desire to cover by Letters Patent is set forth in the appended claims.

What I claim as my invention and desire to secure by Letters Patent is:

1. A throttle control for an aircraft engine, exhibiting the phenomenon of boost reversal at small throttle openings, comprising in combination a throttle valve, a pilot's throttle lever movable from a slow running position, through a point of manual control near to said slow running position but outside the range of boost reversal and on to cruising boost position, a mechanical linkage interposed between said lever and said throttle valve for operating the throttle valve on movement of the lever, and a variable datum boost control device including a servo valve, a barometric control member therefor, an operating connection from the pilot's throttle lever to the barometric control member and a servo piston, movable in a servo cylinder, and arranged to vary the setting of said linkage so as to prevent excessive opening of said throttle valve, wherein movement of the pilot's throttle lever from the slow running to the cruising boost position imparts, through the agency of said mechanical linkage, a relatively small manual opening movement only to the throttle valve, the major portion of the movement of said throttle valve into the position to establish cruising boost being communicated thereto by the servo piston, and wherein the servo mechanism is rendered inoperative through attainment by the servo piston of that limit of movement in its cylinder toward which said servo piston moves on moving to close the throttle valve when the pilot's throttle lever, on movement to close the throttle, reaches the point of manual control, movement of the throttle valve as the pilot's throttle lever moves between the point of manual control and the slow running position is effected solely through the agency of said mechanical linkage.

2. A throttle control for an aircraft engine, comprising in combination a throttle valve, a pilot's throttle lever movable between a slow running and a cruising boost position, a mechanical linkage interposed between said lever and said throttle valve for operating the throttle valve on movement of the lever, and a variable datum boost control device including a servo piston arranged to vary the setting of said linkage so as to prevent excessive opening of said throttle valve, and control means for the servo piston, wherein movement of the pilot's throttle lever from the slow running to the cruising boost position imparts, through the agency of said mechanical linkage, a relatively small manual opening movement only to the throttle valve, the major portion of the movement of said throttle valve into the position to establish cruising boost being communicated thereto by the servo piston, said linkage between the pilot's throttle lever and the throttle valve comprising an eccentric fixed to the pilot's throttle lever and rotatable by movement of said lever, a yoke pivotally mounted on said eccentric, and a linkage connecting one end of the yoke with the throttle valve, and said variable datum setting boost control device including a linkage connecting the opposite end of the yoke with the servo piston control means, manual movement being communicated to the throttle valve from the pilot's throttle lever by rotation of said eccentric, and servo movement being communicated to said throttle valve by rotation of said yoke about said eccentric.

3. A throttle control for an aircraft engine, exhibiting the phenomenon of boost reversal at small throttle openings, comprising in combination a throttle valve, a pilot's throttle lever movable from a slow running position, through a point of manual control near to said slow running position and on to cruising boost position but outside the range of boost reversal, a mechanical linkage interposed between said lever and said throttle valve for operating the throttle valve on movement of the lever, and a variable datum boost control device including a servo valve, a barometric control member therefor, an operating connection from the pilot's throttle lever to the barometric control member and a servo piston, movable in a servo cylinder, between a slow running position at one end thereof and a full throttle position at the other end thereof and arranged to vary the setting of said linkage so as to prevent excessive opening of said throttle valve, wherein movement of the pilot's throttle lever from the slow running to the cruising boost position imparts, through the agency of said mechanical linkage, a relatively small manual opening movement only to the throttle valve, the major portion of the movement of said throttle valve into the position to establish cruising boost being communicated thereto by the servo piston, wherein the servo mechanism is rendered inoperative by movement of the servo piston to the slow running end of the servo cylinder when the pilot's throttle lever, on movement to close the throttle, reaches the point of manual control, the connection from said pilot's throttle lever to the barometric control member being constructed and arranged to prevent operation of said piston away from said slow running end of the servo cylinder as the pilot's throttle lever moves between the point of manual control and the slow running position, so that movement of the throttle valve as the pilot's throttle lever moves between the point of manual control and the slow running position is effected solely through the agency of said mechanical linkage, wherein the major portion of the manual opening movement is communicated to the throttle valve by movement of the pilot's throttle lever over the range from the slow running position to the point of manual control, but wherein a small additional manual movement is imparted to the throttle valve by movement of the pilot's throttle lever between the point of manual control and the cruising boost position.

LEONARD SIDNEY GREENLAND.